Figure 1:
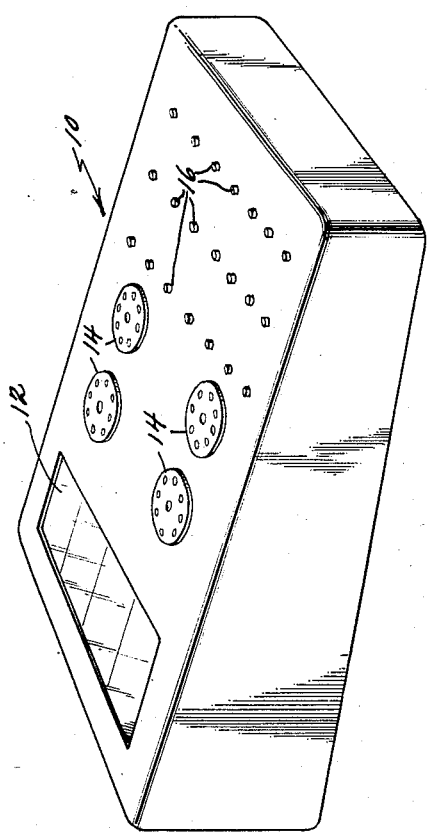

Sept. 29, 1959

G. P. GARMAN 2,906,943

AUTOMATIC TUBE TESTER

Filed March 14, 1955

3 Sheets-Sheet 1

INVENTOR
GEORGE P. GARMAN

BY *Parker and Walsh.*
ATTORNEYS

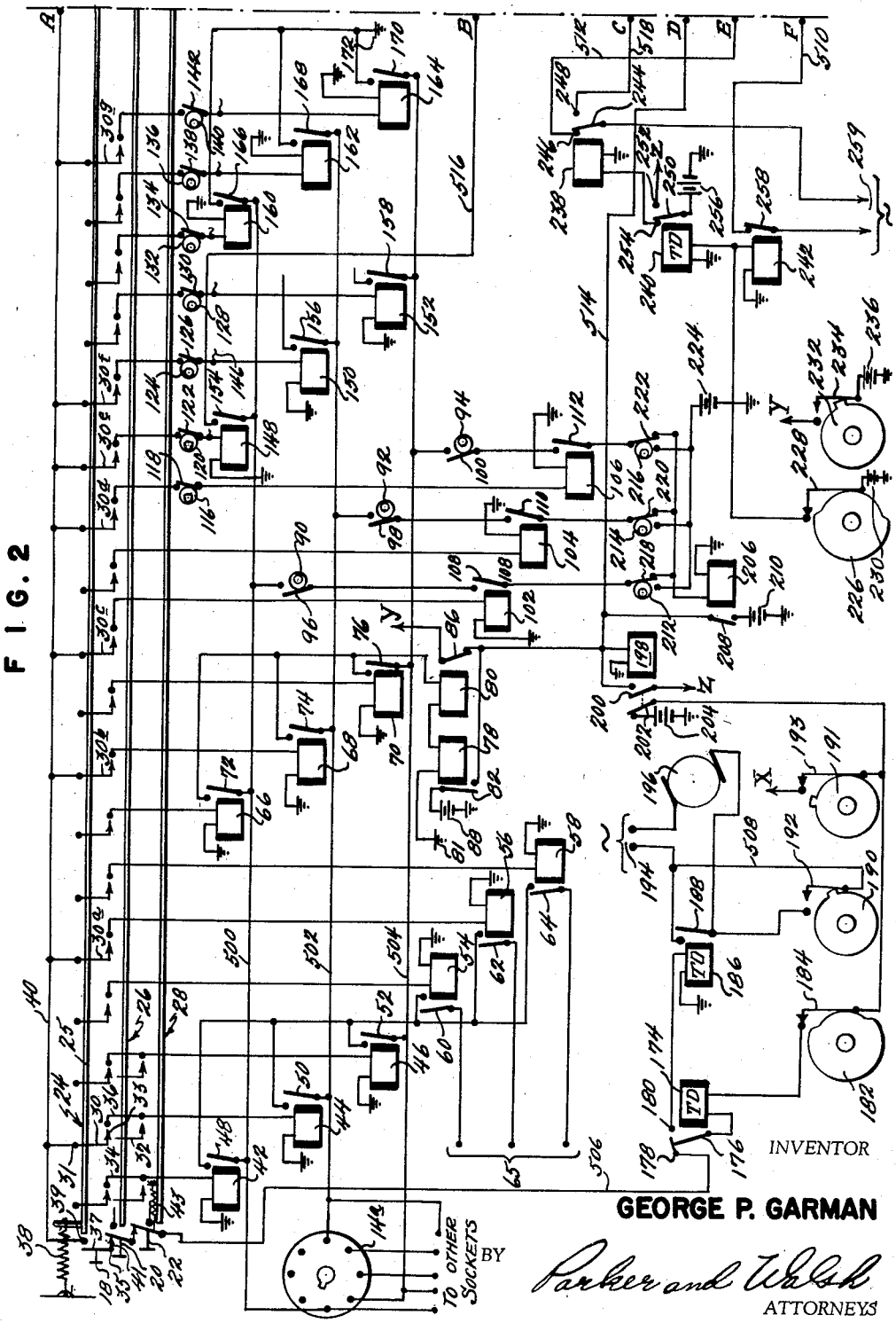

Sept. 29, 1959
G. P. GARMAN
2,906,943
AUTOMATIC TUBE TESTER

Filed March 14, 1955
3 Sheets-Sheet 3

INVENTOR
GEORGE P. GARMAN

*Parker and Walsh*
ATTORNEYS

United States Patent Office 2,906,943
Patented Sept. 29, 1959

2,906,943

AUTOMATIC TUBE TESTER

George P. Garman, Prince Georges County, Md.

Application March 14, 1955, Serial No. 494,148

11 Claims. (Cl. 324—22)

This invention relates to a device for testing electron tubes or the like and more particularly to a device for automatically applying a series of tests to a tube after a single actuation by an operator.

Devices for testing electron tubes have been known for many years and assume divergent forms. The most popular of such devices includes a scale having a plurality of general indications, such as good, fair, weak and bad, a plurality of tube sockets, a plurality of switches, and a tube data roll which may be viewed through a window in the tube tester chassis. In operating a tube tester of this type, the user must turn the roll until the data relating to the tube which is to be tested appears in the window and must then set a plurality of the switches in accordance with the data. In order to subject the tube to a series of tests, as would normally be required, a great many manual switching operations must be performed. Such operations are not only time-consuming but are inherently subject to error.

The tube tester of the present application is extremely simple to operate and requires only that the user place the tube to be tested in an appropriate socket and press a single control labeled in accordance with the tube type. The tube will then be automatically tested and an indication of its condition will appear at the end of the series of tests. Where, in a series of tests, different test results are obtained, the poorest test result will appear as the final indication. The present invention provides a device whereby untrained operators may test a plurality of tube types without danger to themselves or to the test equipment. Repairmen of electronic apparatus may, by employing the instrument of the present invention, free themselves from the necessity of consulting charts and operating numerous switches, etc., and devote the time normally required for these operations to more productive work. Potential buyers of vacuum tubes may test their own tubes without requiring the services of a salesman.

The invention incorporates a reject feature to terminate the electrical tests not only in the case of poor condition of a tube, but also in the event that the operator attempts to change a tube during the tests. The construction of the invention provides for the testing of new tube types with only simple modification of the apparatus.

Accordingly, it is the primary object of the invention to provide a unique tube tester.

A further object of the invention is to provide a tube tester which is completely automatic.

An additional object of the invention is to provide apparatus which will subject a tube to a series of tests and which will give an indication of the poorest test result when the series has been completed.

Another object of the invention is to provide a tube tester which will automatically apply a series of tests to a tube and which will terminate the tests in the event that the tube is defective or the operator uses the apparatus improperly.

Still another object of the invention is to provide an automatic tube tester which may be simply modified to allow the testing of new tube types.

Figure 4:
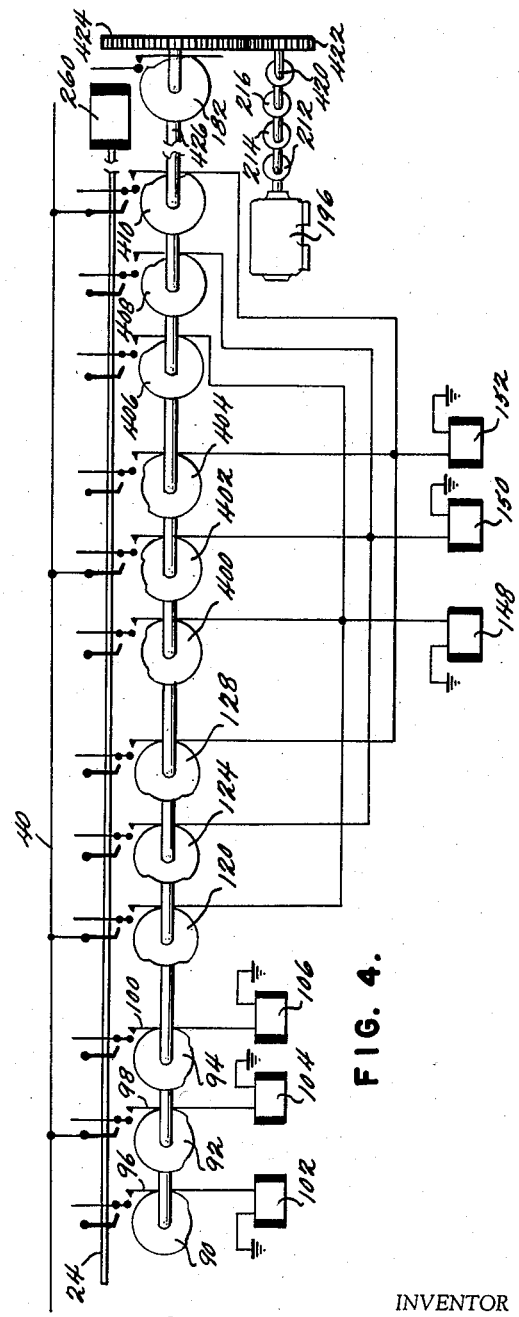
Figure 3:
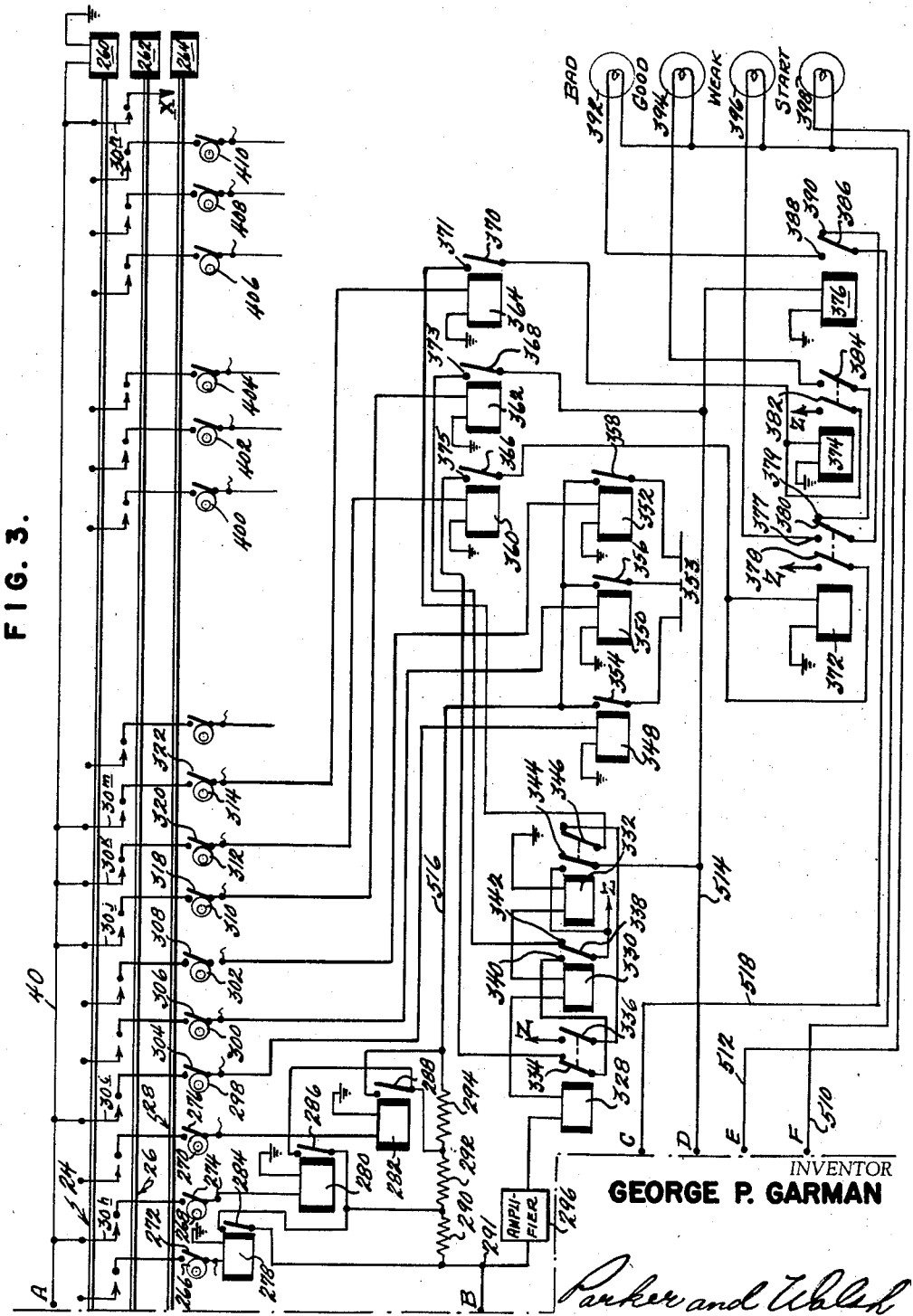

These and other objects of the invention will become more apparent from a consideration of the following detailed description of the invention when taken in conjunction with the accompanying drawings wherein:

Figure 1 is an exterior perspective view of the invention illustrating one form which the tester may assume;

Figures 2 and 3 taken together are the circuit diagram of a preferred embodiment of the invention; and Figure 4 is a circuit diagram of a typical switching assembly of the invention.

Referring to Figure 1, the tube tester of the present invention may comprise a casing 10, a plurality of sockets 14 corresponding to the different conventional bases of the tubes to be tested, a plurality of push buttons 16 or similar actuators corresponding to the different conventional tube types, an indicator 12, and a plurality of test circuits adapted to be set in operation in a predetermined sequential manner by any of the push buttons.

When a particular tube is to be tested, it is placed in the socket corresponding to the tube base and the push button corresponding to the tube nomenclature is depressed. Operation of any push button establishes predetermined circuits required for the testing of a particular tube type. Filament potential of the proper value is applied to the proper tube pins, and after the filament has been heated to the proper operating temperature, a motor is energized to control the actuation of the test circuits. The filament is tested for breaks or overloads, and if either condition is present, a reject relay operates to prevent the energization of subsequent test circuits.

The tube elements are tested for short circuits or crossed circuits, and if such conditions exists, the reject relay operates as before. A plurality of emission tests may then be applied, with the proper elements grouped for connection to a source of potential or to ground. The result of each test is stored, and subsequent to the completion of the tests the poorest test result will appear on the indicator. The latter may have bulbs for displaying bad, good, and weak indications, as well as a bulb for indicating that the apparatus is in condition for the starting of a test run.

Referring to Figures 2 and 3, the specific elements for performing the above functions will now be described. While the circuit has been divided between two figures, it will be appreciated that the portions of the circuit are joined at the dot-dash lines with terminals having the same alphabetical designation being electrically connected. The circuit illustrates the tester in condition for the commencement of a test run. Reference numeral 14a designates a typical tube socket. In practice, all of the sockets may be connected in parallel with corresponding terminals connected together, that is, terminals No. 1 will be connected together, terminals No. 2 will be connected together, etc. Where certain sockets have more than the conventional eight terminals, the additional terminals of such sockets will be connected, respectively. External caps may be provided where required. In Figure 2 only a single socket has been illustrated in order to simplify the description and only three of the wires leading from the tube socket have been shown.

Push buttons 18, 20 and 22 are typical of the push buttons 16 illustrated in Figure 1. Each of the push buttons is associated with a draw bar switch, such as switches 24, 26 and 28. To simplify the description, only three of the push buttons and associated draw bar switches have been illustrated. Each draw bar switch may comprise a rod of insulating material, such as rod 25, and a plurality of movable switch arms, such as arm 30, which may be affixed orthogonally to the insulating rod. Each switch arm is provided with a terminal 31 which may serve to join the arm to a jumper or strapping network 40. Each arm is also provided with a contact 33 for cooperation with a stationary contact arm 36 which is common to a plurality of draw bar switches. One end of each draw bar switch may be connected to a spring such as element 38 to bias the switch in a first position, and the other end of each switch may be provided with a solenoid, such as solenoids 260 to 264 (Fig. 3) which, when actuated, will draw the switch to a second position against the bias of spring 38. The insulating rod 25 may be conveniently supported by bearing members (not shown) at each of its ends. Upon actuation of a solenoid, the associated insulating rod will be moved to that position in which the contacts 33 engage the stationary contact arms 36.

Just as there is a single push button corresponding to each of the tube types to be tested, there is also a single draw bar switch for each tube type. Only particular movable switch arms are employed in conjunction with the testing of a specific tube type, as evidenced by the fact that only switch arms 30 and 30a through 30n of draw bar switch 24 are connected to strapping 40. While the draw bar switches may be identical, having sufficient movable switch arms to accommodate any test, it is possible to simplify individual draw bar switches by eliminating the contact arms which are unnecessary to the testing of a particular tube type. Where this is done, the draw bar switches may include conductive rods instead of insulating rods and only those movable switch arms which are to be utilized are attached to the conductive rods. In this way the conductive rods may not only serve as a support for the movable switch arms but may also constitute the jumpers or strapping for connecting the movable switch arms to a source of potential. Elimination of the unnecessary contact arms as well as the inertia of the jumpers will substantially reduce the load on the respective solenoids 260 to 264.

In Figures 2 and 3 only the strapping for a single draw bar switch has been illustrated, but it will be appreciated that each of the draw bar switches is provided with its own strapping, just as it is provided with its own solenoid. While one end of the strapping is connected to the solenoid, the other end is provided with a terminal, such as terminal 39, which is designed to engage a main switch arm, such as arm 37, of the associated push button. Arm 37 may be pivotable about a fulcrum, as designated by reference numeral 35, and may be conductively connected to an auxiliary switch arm 41 which is pivotable about fulcrum 35 with arm 37 and which is designed to engage the main switch arm of the adjoining push button. The main switch arms may be biased against the auxiliary arms by compression springs, such as spring 43. When none of the push buttons is depressed (the condition illustrated in Figure 2), the push buttons form a conductive path from one end of the series of buttons to the other. The heads of the buttons may, of course, be composed of insulating material. As will appear hereinafter, the button at one end of the series (button 22) is connected (by wire 506) to a source of potential for energizing the strapping, and each button is connected to the source through the conductive path provided by the preceding buttons.

When a push button is depressed, for example push button 18, it will engage the stationary contact of the strapping, such as contact 39, and will thereby connect the source of potential to the solenoid, such as 260, at the end of the associated strapping network. If an intermediate button, such as button 20, is depressed it will not only connect its associated strapping network to the source of potential but will at the same time disconnect the succeeding push buttons from the source of potential by virtue of the rotation of its main switch arm about the fulcrum away from the auxiliary switch arm of the succeeding push button. Thus if, by accident, more than one button is depressed, only the circuit associated with the button closest to wire 506 will be energized. The foregoing push button arrangement is not essential to the tester as a whole, and if desired, each push button may be individually arranged to connect wire 506 to its associated strapping.

Assuming that push button 18 is depressed, it will be noted that predetermined movable switch arms associated with draw bar switch 24 are connected to the strapping network 40. Which switch arms are connected will, of course, depend upon the type of tube to be tested. Push button switch arm 37 will engage terminal 39 thereby connecting the field coil of solenoid 260 (in Fig. 3) from ground, through the strapping network 40, through the series of push buttons, wire 506, a contact 178, a switch arm 176, the field coil of a relay 174, a switch arm 184, a contact arm 202, through a battery 204, back to ground. Solenoid 260 will accordingly be energized and draw bar switch 24 will be drawn closed by the solenoid. The closing of the draw bar switch will cause switch arm 30n to engage its associated stationary contact arm and connect strapping network 40 to terminal X. Terminal X is connected to battery 204 through the switch arm 193 of a cam switch 191. This switch is normally closed, and accordingly the strapping network is energized from the source 204. Solenoid 260 thus remains locked as long as switch arms 193 and 202 are in the positions shown, and the push button need be depressed only momentarily.

When the push button is depressed, however, relay 174 is energized from battery 204. This relay is designed to have a sufficient time delay to allow solenoid 260 to be energized before arm 176 of relay 174 is drawn from contact 178 to contact 180. After the slight delay required, contact 180 is engaged by arm 176 thereby energizing relay 186 and at the same time completing a locking circuit for relay 174 from the battery 204. Relay 186 is designed to have a time delay of approximately one minute to allow the tube filament to reach the proper temperature before the tests proceed. After this delay, arm 188 is closed upon its cooperating contact, and a supply circuit for a motor 196 is completed from a standard A.C. source 194.

Motor 196 drives a plurality of cam sequence switches, the function of which will be described in connection with the individually controlled circuits. When the motor begins to operate, a cam switch 190 allows its switch arm 192 to close, and shortly thereafter a cam switch 182 opens its switch arm 184. When the latter event occurs, relay 174 is deenergized allowing switch arm 176 to return to contact 178 and thus conditioning relay 174 for a new cycle of operation. When this relay is deenergized, relay 186 is also deenergized, opening switch arm 188. However, since switch arm 192 is in its closed position, the motor circuit is completed through wire 508, and the motor is then under the control of cam switch 190.

Switch arm 228 associated with a cam switch 226 is in its closed position when motor 196 is deenergized. Accordingly, a relay 242 is energized from a battery 230, closing its switch arm 258 and completing a circuit from one side of a standard A.C. source at 259 to wire 510, the common lead-in for a plurality of indicator bulbs 392, 394, 396 and 398 (in Figure 3). A relay 240 is also energized, drawing its switch arm 250 into engagement with contact 254, thereby energizing a relay 238 from a battery 256 and drawing switch arm 244 into engagement with contact 246. This completes a circuit from the other side of the A.C. line at 259 through wire 512 to indicator bulb 398, which may be designated by the word "Start." Thus in the deenergized condition of motor 196 the start bulb will be lit indicating that the apparatus is in condition for operation. When the motor begins to operate, however, cam switch 226 opens switch arm 228, deenergizing relays 238, 240 and 242, and thereby extinguishing the "start" lamp 398.

Closure of draw bar switch 24 energizes one of relays 42, 44, 46 and causes the corresponding switch arm 48, 50 or 52 to close. These relays are provided to select the proper tube socket lead, either 500, 502 or 504 to be connected to a source of filament supply at the taps 65. One of relays 54, 56, 58 is also energized, causing the associated switch arm 60, 62 or 64 to close, thereby selecting one of the taps 65 for connection to the selected tube socket lead. The potentials at taps 65 are predetermined according to the filament voltage requirement of the tubes to be tested. One of relays 66, 68, 70 is energized closing the respective switch arm 72, 74 or 76, and thereby selecting the proper tube socket lead for connection to ground at 81 through the field coils of marginal relays 78 and 80. Relay 78 is an over-load relay and closes in the event that the filament current is excessive, while relay 80 is an open circuit relay and opens in the event that no filament current or insufficient filament current flows (also if the tube is removed from the socket).

When the motor is energized, a cam switch 232 allows its switch arm 234 to close, thereby applying the potential of a battery 236 to terminal Y. This terminal is connected to the similarity designated terminal associated with switch arm 86 of the previously described marginal relay 80. Thus a potential is available at switch arm 86 to energize a reject relay 198. This potential is unavailable, however, until relay 80 has had the opportunity to be energized by the flow of filament current, thus preventfalse operation of the reject relay.

In the event that an open filament exists, switch arm 86 will close, and in the event that an over-load exists switch arm 82 will close. In either case a potential will be applied to relay 198, either from terminal Y or a battery 88. Switch arm 200 will close, and switch arm 202 will open. When switch arm 202 opens, the potential of battery 204 is removed from the terminal X associated with cam switch 191, and accordingly potential is removed from the terminal X associated with the strapping 40 and solenoid 260. The solenoid will be deenergized, allowing spring 38 to open draw bar switch 24 and thereby preventing any of the succeeding electrical tests, The motor will, of course, continue to operate.

Reject relay 198 is self-locking by virtue of the fact that when switch arm 200 is closed, a circuit to the relay field coil is completed from the associated terminal Z to the corresponding terminal Z associated with contact 252, switch arm 250 and battery 256. It will be recalled that relay 240 was deenergized upon commencement of the motor cycle allowing switch arm 250 to engage contact 252. Closure of switch arm 200 associated with the reject relay will also apply the potential at terminal Z to wire 514, thereby energizing a relay 376 in Figure 3 and drawing switch arm 386 into engagement with contact 388. As will be seen hereinafter, energization of relay 376 insures an indication on lamp 392 (which may be designated by the word "bad") at the end of the tests.

Assuming that the filament circuit is in good condition and that the reject 198 has not been operated, the draw bar switch will remain in its closed position. Relays 102, 104 and 106, or those which are connected to the strapping, will be energized, thereby closing the respective switch arms 108, 110 and 112. At the proper time in the cycle of the tester cam switches 90, 92 and 94 will simultaneously allow switch arms 96, 98 and 100 to close, thereby connecting the associated socket wires 500, 502, 504 into the circuit for testing shorts or crosses. This circuit is controlled by cam switches 212, 214, 216 which are actuated individually to allow switch arms 218, 220, 222, respectively to engage one of a pair of associated contacts. One of the contacts associated with each of cam switches 218, 220, 222 is connected to a battery 224 while the other is connected to ground through a relay 206. Cam switches 212, 214, 216 may be designed according to conventional practices so that at any given test instant one of the switches connects its associated socket wire to battery, while the other switches connect their associated socket wires to ground. Any leakage of current to the grounded elements from the element connected to battery 224 will energize relay 206. The tube elements may be tested for crosses and shorts in sequence until each element has been tested with respect to each of the other elements. In the event that a pair of elements is internally connected, the connections of relays 102, 104, 106 to the strapping 40 will be arranged so that one of such elements will not be connected into the shorts and crosses testing circuit, and relay 206 will not be energized because of the desired internal connection. When relay 206 is energized, switch arm 208 closes, applying the potential of a battery 210 to reject relay 198 and locking the reject relay as set forth previously.

Assuming that the results of the tests are good to this point, a plurality of cam switches 116, 120, 124, 128, 132, 136, 140, 266, 268, 270, 298, 300, 302 will close their respective switch arms 118, 122, 126, 130, 134, 138, 142, 272, 274, 276, 304, 306, 308 simultaneously, energizing the relays associated with these switches, assuming, of course, that the switches have been connected to strapping 40. Relays 148, 150, 152 and associated switch arms 154, 156, 158 select the socket leads 500, 502 and 504 to be connected to the potential source of the emission testing circuit. In the example illustrated in Figure 2, only relays 148 and 150 will be closed upon closure of switch arms 122 and 126. Relays 160, 162, 164, and associated switch arms 166, 168, 170 determine which of the socket leads shall be connected to ground at 172. In the example illustrated only relay 164 will be energized, thereby closing switch arm 170 upon closure of switch arm 142. Relays 278, 280, 282 and associated switch arms 284, 286, 288 determine what portion of the resistance constituted by resistors 290, 292 and 294 shall be applied to the emission testing circuit. In the example illustrated in Figure 3 only relay 280 will be energized, thereby closing its switch arms 286 and shorting out resistor 292. The remaining resistance, comprising resistors 290 and 294, will then be a part of the emission testing circuit. Relays 348, 350, 352 and associated switch arms 354, 356, 358 determine the potential to be applied in the emission test from the taps 353. In the example illustrated relay 348 will be energized, thereby connecting wire 516 to the emission potential at one of the terminals 353 through switch arm 354.

In the emission test a plurality of tube elements is connected to the emission battery and the remaining elements (cathode and heater) are connected to ground. The condition of the emissive elements tested will be determined by the magnitude of the current flowing through the resistors 290, 292, 294 or those in the circuit. The resistance inserted in the emission testing circuit is predetermined so that for a good tube of a given type and a given emission potential at terminals 353, the potential at the input terminal 291 to an amplifier 296 will lie within a predetermined range. The output of the amplifier is connected to ground through relays 328, 330 and 332 in series. These relays are of the marginal type and determine whether the emission is good, weak or excessive.

Assume, for example, that the emission is good. In this case the output of amplifier 296 will be sufficient to energize relay 328, which may be termed the "good relay," and 330, which may be termed the "weak relay," but will be insufficient to energize relay 332, which may be termed the "excessive or bad relay." Accordingly, switch arm 334 will open; switch arm 336 will close; switch arm 338 will close on contact 340; and switch arms 344 and 346 will remain in the position illustrated. A potential will then be applied from terminal Z associated with switch arm 336 (the same terminal associated with battery 256 in Figure 2) through switch arm 346 to contact 371 associated with a relay 364. At the proper time cam switches 310, 312 and 314 will simultaneously close associated switch arms 318, 320, 322 energizing relays 360, 362 and 364 respectively, from the strapping. When relay 364 is energized, switch arm 370 will close on contact 371, and the potential at terminal Z will be applied to energize a relay 374, thereby closing switch arms 382 and 384. Relay 374 is self-locking by virtue of the potential existing at terminal Z associated with switch arm 382. Closure of arm 384 will connect bulb 394, which may be designated by the word "good," through switch arm 380 of a relay 372, through switch arm 386 of relay 376, through wire 518 to contact 248, through switch arm 244 (now closed on contact 248) to one side of the A.C. source at 259. As will appear hereinafter, in the event that a poorer result has not been obtained in a previous test or is not obtained in a subsequent test, at the end of the cycle the good bulb 394 will be lit.

Assuming that the output of amplifier 296 is insufficient to energize the "good" relay 328, but is sufficient to energize the "weak" relay 330, switch arm 338 will close on terminal 340, leaving the switch arms associated with the other two relays in the positions shown. A circuit will then be completed from the terminal Z associated with switch arm 338 through contact 340, switch arm 334, to contact 375 associated with relay 360, and when relay 360 is energized by its associated cam switch, switch arm 366 will close on contact 375, extending the potential at terminal Z to energize a relay 372. Energization of this relay will cause switch arm 378 to close and switch arm 380 to close on contact 377. By virtue of the potential of terminal Z connected to the contact associated with switch arm 378, relay 372 will be self-locking. Closure of switch arm 380 on contact 377 will connect lamp 396, which may be designated by the word "weak," through switch arm 386 associated with relay 376, through wire 518, to one side of the A.C. source at 259. In the event that a bad result has not occurred in a previous test or does not occur in a subsequent test, weak bulb 396 will be lit at the end of the tests.

Assuming that the output of the amplifier 296 is excessive, relays 328, 330 and 332 will all be energized, closing switch arm 336, closing switch arm 338 on terminal 340 and closing switch arm 344. A circuit may then be traced from the terminal Z associated with switch arm 344, through wire 514 to the reject relay 198 in Figure 2. The reject relay will lock as described previously and further electrical tests will be prevented. At the same time a circuit is completed through wire 514 to energize relay 376, thereby closing switch arm 386 on contact 388 and completing the circuit from the "bad" bulb 392 through wire 518 to one side of the A.C. source at 259. Relay 376 is self-locking by virtue of the potential at terminal Z associated with arm 200 of reject relay 198 and applied through wire 514.

If the output of the amplifier is insufficient to energize even relay 330, the switch arms of relays 328, 330, 332 will remain as shown. When relay 362 closes, relay 376 and the reject relay 198 will be energized from the terminal Z associated with arm 338 and contact 342 of relay 330, to give a "bad" indication.

At the proper time, the cam switches associated with the first emission test will open and additional emission tests may be performed. The switches for establishing the circuitry for these tests are illustrated by switches 400 through 410. It will be appreciated that the same relays may be employed for each of the emission tests simply by connecting such relays to corresponding cam switches for each of the tests. Thus in Figures 2 and 3 bridging wires, illustrated by wire 146 associated with relay 150, are employed.

Relays 372, 374, 376 constitute means for storing the test results. Once one of relays 372, 374, 376 has been locked, it will remain locked until the end of the series of tests regardless of the result of subsequent tests. At the end of the tests, therefore, one or more of these relays may be in a locked condition.

Assume, for example, that the results of all tests are good. In this case relay 374 will be locked and relays 372 and 376 will be deenergized. The circuit for the "good" lamp 394 will be traced to one side of A.C. source 259, as set forth previously. The same is true if either of relays 372 or 376 is locked with the others deenergized. However, suppose that the result of one test was "good" and the result of another test was "weak." In that event relays 372 and 374 will be energized. Energization of relay 372 will prevent energization of the "good" bulb 394, because the circuit from switch arm 384 through contact 379 and switch arm 380 will be broken. If the "bad" storage relay 376 is energized in any test, switch arm 386 will be out of engagement with contact 390, thus preventing the energization of the "weak" bulb through switch arm 380 and contact 390, or the "good" bulb through switch arm 384, switch arm 380 and contact 390. In this manner, only the poorest test result will appear as the final indication.

When the apparatus reaches the end of its cycle, several events occur. The cam switch 182 allows switch arm 184 to close thereby reestablishing connection to relay 174; the cam switch 191 opens switch arm 193 thereby deenergizing the strapping network and allowing the draw bar switch to return to its initial position; cam switch 232 opens switch arm 234, removing the potential of battery 236 from the Y terminal; cam switch 190 opens switch arm 192, breaking the motor circuit; and cam switch 226 allows switch arm 228 to close, energizing relay 242 from battery 230. Energization of this relay closes switch arm 258, completing the circuit from wire 510 to one side of the A.C. source at 259. Wire 510 is the common wire for all of the indicator bulbs. Since one of the bulbs has been previously connected to the other side of his source through an associated storage relay, this bulb will now be lit giving the final test results.

When switch arm 228 closes, the potential of battery 230 is also applied to relay 240. Relay 240 is designed to have a time delay of approximately 15 seconds. This insures the application of the potential of battery 256 to terminal Z long enough to allow the test results to register. After the time delay, switch arm 250 closes on terminal 254 thereby deenergizing terminal Z, energizing relay 238, and closing switch arm 244 on terminal 246. When this occurs A.C. source 259 is again connected to the start bulb 398 through wire 512, and the apparatus announces the fact that it is in condition for another series of tests.

Figure 4 illustrates a typical arrangement of cam sequence switches and an associated draw bar switch. Corresponding reference numerals have been utilized in Figures 2, 3 and 4. The bridging of the cam switches for successive emission tests is clearly indicated by the connection of switches 120, 124, 128, 400, 402, 404, 406, 408, and 410 to the relays 148, 150, 152. In this figure, a plurality of switches is mounted on one shaft 426, while another plurality of switches is mounted on a shaft 420. These shafts may be connected by gears 422, 424 and are accordingly driven by the motor 196. The arrangement shown is indicative of the fact that some of the switches, such as the short-cross switches 212, 214 and 216, may be driven at a faster rate than the other switches.

In the above description of a preferred embodiment of the invention, the tests set forth are merely illustrative. It will be appreciated that other types of tests may be performed by merely energizing the specific test circuits from the strapping associated with the draw bar switches, and actuating and connecting such circuits to the proper socket terminals at predetermined times. Although, the sockets have been described as interconnected, it is evident that sockets may be connected individually to the test circuits upon actuation of predetermined draw bar switches.

Where batteries and A.C. sources have been illustrated, it will be appreciated that all of the necessary power requirements may be derived from a single power supply having the necessary taps. Moreover, a master switch may be provided to deenergize all of the circuits when the tester is idle. New tube types may be accommodated by providing extra push buttons and draw bar switches, which may be wired in accordance with the operating conditions of the new tubes.

While a preferred embodiment of the invention has been shown and described it will be evident to those skilled in the art that innumerable modifications may be made without departing from the essential principles of the invention. The embodiments shown and described are merely illustrative of the invention and should not be construed as restrictive. The scope of the invention is defined in the following claims.

I claim:

1. In an electron tube tester or the like, a plurality of tube sockets adapted to receive respectively tubes having different base configurations, a plurality of actuator means corresponding respectively to different tube types, an indicator, automatic means responsive respectively to a single actuation of said actuator means for establishing predetermined test circuits for the particular tube type corresponding to the actuated actuator, for establishing predetermined connections between said circuits and at least one of said sockets, for operating said test circuits, and for connecting said test circuits to said indicator, all in accordance with a predetermined time sequence.

2. The device of claim 1, wherein said actuator means are interlocked to prevent actuation of more than one actuator means at a time.

3. The device of claim 1, wherein said actuator means comprise switches, and further including means for holding said switches in a predetermined condition, upon instantaneous actuation thereof, until the testing of a tube is completed.

4. The device of claim 1, said operating means comprising a sequence timer.

5. The device of claim 4, further including means for delaying the operation of said sequence timer after said single actuation to allow the heater of the tube to be tested to reach its operating temperature.

6. The device of claim 4, said sequence timer being energized responsive to said single actuation and deenergizing itself when the testing of a tube is completed.

7. The device of claim 1, said indicator having means for displaying a first indication when said tester is idle, and any one of a plurality of test result indications for a predetermined period after the testing of a tube is completed.

8. In apparatus of the type described, means for receiving a device to be tested, means for connecting a plurality of tester means to said receiving means, means for actuating said tester means in a predetermined sequence to produce a plurality of test results corresponding to any one of a plurality of degrees of fitness, means for storing said test results, display means requiring actuation to indicate any one of said degrees of fitness and means operable after actuation of all of said tester means for positively actuating said display means from said storage means to display only the test result corresponding to the lowest degree of fitness of the stored results.

9. In a device for testing electron tubes, means for receiving an electron tube to be tested, a plurality of actuators, automatic means responsive respectively to a single actuation of said actuators for energizing predetermined test circuits and for establishing predetermined connections from said circuits to said receiving means, reject means responsive to predetermined conditions in said test circuits for automatically deenergizing said test circuits and breaking said connections, means responsive to said single actuation for automatically operating at least some of said test circuits according to a predetermined time sequence, and for automatically deenergizing said test circuits and breaking said connections at the end of said sequence, and indicator means responsive to conditions in said test circuits.

10. The device of claim 9, said test circuits including a circuit for measuring tube filament current, for detecting short circuits or crossed circuits between tube elements, and for measuring cathode emission, said reject means being responsive to predetermined conditions in each of the aforesaid test circuits.

11. In an electron tube tester, means for receiving an electron tube to be tested, a plurality of tester means, means for connecting said tester means to said tube receiving means, means for operating said tester means according to a predetermined sequence to produce test results, storage means, means for connecting each of said tester means to said storage means after operation of each said tester means, respectively, indicator means, and means for connecting said storage means to said indicator means after operation of all of said tester means, said indicator means comprising a plurality of indicator elements, said storage means comprising a corresponding plurality of storage elements, and means for preventing concurrent connection of more than one of said storage elements to one of said indicator elements, respectively.

References Cited in the file of this patent

UNITED STATES PATENTS

| | | |
|---|---|---|
| 1,932,337 | Dowling | Oct. 24, 1933 |
| 2,198,503 | Morrison | Apr. 23, 1940 |
| 2,424,275 | Hansen et al. | July 22, 1947 |
| 2,507,566 | Frisbie et al. | May 16, 1950 |